June 24, 1930.　　W. A. RUGGLES　　1,768,421
ELECTRON DISCHARGE DEVICE
Filed Dec. 14, 1927
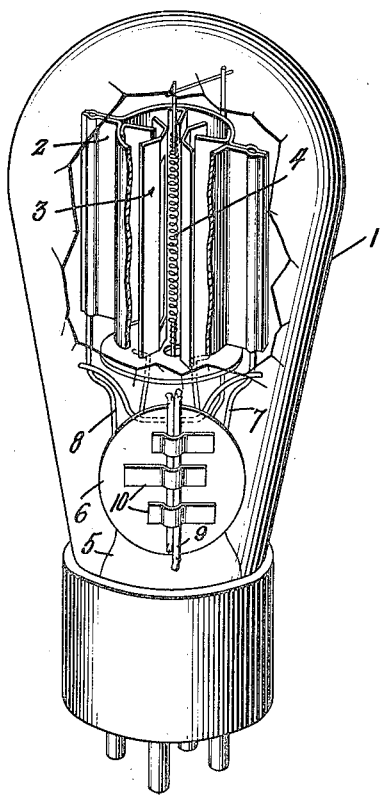
Inventor:
William A. Ruggles,
by
His Attorney Patented June 24, 1930

1,768,421

UNITED STATES PATENT OFFICE

WILLIAM A. RUGGLES, OF SCHENECTADY, NEW YORK, ASSIGNOR TO GENERAL ELECTRIC COMPANY, A CORPORATION OF NEW YORK

ELECTRON-DISCHARGE DEVICE

Application filed December 14, 1927. Serial No. 240,023.

The present invention relates to electron discharge devices and to means for introducing alkali metal into such devices.

The introduction of alkali metals into electron discharge devices is usually attended with difficulties due to the fact that such metals oxidize very rapidly. It has hitherto been customary in introducing alkali metals into discharge devices to place an alkali compound, together with a suitable reducing agent, into a small metal container mounted in the discharge device. Upon application of heat to the container the reducing agent reacted with the alkali compound thereby liberating the alkali metal. This method has undesirable features, however, due to the fact that compounds are formed by the interaction of the alkali compound with the reducing agent and these compounds remain in the discharge device often causing a discoloration of the container and increasing the danger of short-circuits within the discharge device. While alkali metal has been introduced into electron discharge devices from metal capillary tubes filled with alkali metal adapted to be released upon application of heat to these tubes, this latter method also has disadvantages since there is a tendency for the alkali to unite with the metal tube. Furthermore, it is very difficult to make metal capillary tubes, suitable for use in electron discharge devices, which are gas-tight. As a result alkali metal placed in such tubes deteriorates comparatively rapidly and is soon unfit for use.

According to the present invention pure alkali metal is placed in suitable glass capillary tubes in accordance with the method outlined in the copending application of Brophy et al. filed August 29, 1927, Serial No. 216,118. These glass capillaries are made from a sodium-magnesium-borosilicate glass known to the trade as G702P, the latter being made by the Corning Glass Works of Corning, N. Y. This glass contains an appreciable amount of lead and is very resistant to heat. When an alkali metal, such as cæsium, is introduced into such a capillary tube the end portions of the tube are sealed by application of heat. These end portions become blackened in the fusing operation, the cæsium in the end portions of the capillary tubes reacting with the glass and forming a vitreous material having a different coefficient of expansion from the intermediate portions of the capillary tube. When such a tube is mounted on a metal disc and heat applied thereto the end portions of the capillary crack and allow the cæsium to flow out of the capillary. I have found it desirable to mount the capillary tubes on a metal disc in such a manner that the end portions of the capillary are adjacent the perimeter of the disc. Since the outer portion of the disc attains a high temperature more quickly than the central portion of the disc when a high frequency current is applied thereto, the end portions of the capillary are very soon heated to a high temperature which causes the end portions of the tube to crack and permit the cæsium to flow out of the capillary. This action takes place without shattering the capillary tube and as a result no pieces of loose material are left in the tube after the alkali metal is liberated.

The novel features which I believe to be characteristic of my invention are set forth with particularity in the appended claims. My invention itself, however, will be better understood from reference to the following specifications when considered in connection with the accompanying drawing in which the single figure shows an electron discharge device partly broken away which embodies the features of the present invention.

Referring to the drawing, I have indicated at 1 an evacuated receptacle or tube in which is mounted the usual anode 2, grid 3 and cathode 4 all supported from a stem 5 through which leading-in wires extend and supply a potential to the elecrodes. A thin metal disc 6, which may be made of nickel or other suitable material, is mounted on a leading-in wire 7, and a supporting wire 8 which are connected to the anode 2. A sealed gas-tight glass capillary tube 9 made from a borosilicate glass containing an appreciable amount of lead is mounted on the disc 6. This capillary is filled with cæsium or other suitable alkali metal and is secured to the disc 6 by metal straps 10, the capillary tube being so mounted that the end portions thereof are adjacent the perimeter of the disc. When it is desired to liberate the cæsium in the capillary, disc 6 is heated by a high frequency current. The edge portion of the disc first attains a high temperature and quickly causes the end portions of the glass capillary 9 to crack and the cæsium to distil out of the capillary and into the tube. The liberation of the cæsium is effected without shattering the capillary.

In this manner, it is possible to introduce substantially pure alkali metal into the tube. While I have used the term "alkali" in both the specification and claims, I do not intend that this term shall be limited to alkali metals only since alkaline earth metals might be used instead of the alkali metals if desired. Furthermore, a plurality of capillaries may be employed instead of a single capillary depending upon the amount of alkali to be introduced into the tube. Although I have illustrated the invention in connection with a three-element electron discharge device, the electrodes of which are adapted to be coated with alkali metal, the method and apparatus disclosed may be applied equally well in forming a light sensitive coating in a photo-electric cell, as disclosed in the co-pending application of Bainbridge, filed January 4, 1928, Serial No. 244,533.

What I claim as new and desire to secure by Letters Patent of the United States is:—

1. An electron discharge device comprising an evacuated receptacle, means for introducing an alkali metal into said receptacle, said means including a metal disc mounted in the receptacle, said disc having a sealed gas-tight vitreous capillary tube secured thereto, said tube containing alkali metal.

2. An electron discharge device comprising an evacuated receptacle, means for introducing an alkali metal into said receptacle, said means comprising a metal disc and a sealed gas-tight glass capillary tube mounted on the disc, the end portions of the capillary tube being adjacent the perimeter of the metal disc, said tube containing alkali metal.

3. In combination, an evacuated receptacle, and means for introducing an alkali metal into said receptacle, said means comprising a metal disc and a sealed, gas-tight, capillary tube mounted on the disc, said tube containing alkali metal and having a fused end portion, the fused end portion having a different coefficient of expansion from the intermediate portion of the tube, the fused portion of the tube being mounted adjacent the perimeter of the disc.

4. An electron discharge device comprising a container, means for introducing an alkali metal into said container, said means comprising a metal disc and a sealed gas-tight capillary tube made from glass containing an appreciable amount of lead mounted on the disc, said capillary containing an alkali metal.

5. An electron discharge device comprising a container, means for introducing an alkali metal into said container, said means comprising a metal disc and a sealed gas-tight, borosilicate glass capillary tube mounted on the disc and containing an alkali metal.

6. An electron discharge device comprising a container, an electrode mounted therein, a leading-in wire connected to the electrode, a metal disc mounted on the leading-in wire, and a glass, gas-tight capillary tube mounted on the disc, the end portions of said capillary tube having a different coefficient of expansion from the intermediate portions of the tube.

In witness whereof, I have hereunto set my hand this 13th day of December, 1927.

WILLIAM A. RUGGLES.